US008542845B2

(12) United States Patent
Cho

(10) Patent No.: US 8,542,845 B2
(45) Date of Patent: Sep. 24, 2013

(54) WIRELESS STEREO HEADSET

(75) Inventor: Min-Won Cho, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1390 days.

(21) Appl. No.: 11/406,967

(22) Filed: Apr. 19, 2006

(65) Prior Publication Data

US 2006/0251277 A1 Nov. 9, 2006

(30) Foreign Application Priority Data

Apr. 19, 2005 (KR) ........................ 10-2005-0032227

(51) Int. Cl.
*H04R 1/10* (2006.01)
*H04M 1/00* (2006.01)

(52) U.S. Cl.
USPC .......... 381/74; 381/384; 455/41.2; 455/575.2

(58) Field of Classification Search
USPC ............ 381/309, 370–384, 74, 11; D14/205; 379/430; 455/575.1, 575.2, 569.1, 3.01, 455/3.05, 3.06, 41.2
See application file for complete search history.

(56) References Cited

U.S. PATENT DOCUMENTS

| 5,003,589 A * | 3/1991 | Chen ........................ 379/433.11 |
| 5,841,858 A * | 11/1998 | Frierson ........................ 379/430 |
| 6,006,115 A * | 12/1999 | Wingate ...................... 455/575.2 |
| 6,519,448 B1 * | 2/2003 | Dress et al. .................. 455/41.2 |
| 7,627,289 B2 * | 12/2009 | Huddart ...................... 455/575.2 |
| 2002/0001381 A1 | 1/2002 | Mori |
| 2002/0039424 A1 | 4/2002 | Watanuki |
| 2003/0073460 A1 * | 4/2003 | van Pelt et al. ............... 455/556 |
| 2006/0165243 A1 * | 7/2006 | Lee ................................ 381/74 |

FOREIGN PATENT DOCUMENTS

| CN | 1325250 | 12/2001 |
| CN | 1572124 | 1/2005 |
| EP | 1 398 994 | 3/2004 |
| JP | 2004-120313 | 4/2004 |
| WO | WO 03/034782 | 4/2003 |
| WO | WO 2004/052049 | 6/2004 |

* cited by examiner

Primary Examiner — Xu Mei
(74) Attorney, Agent, or Firm — The Farrell Law Firm, P.C.

(57) ABSTRACT

Disclosed is a wireless stereo headset. The wireless stereo headset includes a first headset including a speaker unit and a Bluetooth® enabled module, for converting sound signals received from a device, transmitting the sound signals into sounds and outputting the sounds, and a second headset including a speaker unit and a Bluetooth® enabled module, for selectively receiving a portion of the sound signals which are converted into sounds and outputting the sounds, thereby accomplishing mono sound by using the first headset according to a user's request or achieving stereo sound by using the first and second headsets. The wireless stereo headset can perform voice communication by using only the first headset, while accomplishing stereo sounds by using both the first and second headsets, thereby using the wireless stereo headset to enjoy an improved sound quality.

12 Claims, 5 Drawing Sheets

WIRELESS STEREO HEADSET

PRIORITY

This application claims priority to an application entitled "Wireless Stereo Headset System" filed in the Korean Industrial Property Office on Apr. 19, 2005 and assigned Serial No. 2005-32227, the contents of which are incorporated herein by reference.

BACKGROUND OF THE INVENTION

1. Field of the Invention

The present invention relates to a headset, and more particularly to a wireless stereo headset including a pair of mono headsets, for performing wireless communication with sound devices and providing a stereo function for listening to music while conveniently carrying out voice communication using a portable terminal wirelessly connected with a mono headset.

2. Description of the Related Art

Generally, a term "headset" refers to an auxiliary device capable of providing sounds into which sound signals output from a sound device are converted to a user and transferring electric signals into which user's voice is converted to the sound device or a portable terminal in order to record the user's voice or to communicate with others, while the user wears the headset on his/her head.

Traditionally, the primary users of headsets have been telemarketers, consultants, and public relations personnel or persons chatting over the Internet. Such a headset includes a speaker outputting sound and a microphone for converting the user's voice into electric signals, and is fabricated in a single body shape.

Meanwhile, as the use of portable terminals providing mobile communication services has gradually expanded, the portable terminal has expanded to employ a hands-free device, such as a headset. The typical hands-free device has provided only a function for voice communication using the portable terminal.

The mobile communication services have gradually expanded to provide multimedia services, as the necessary communication technology and equipment have been developed. Thus, functions of the portable terminals are rapidly developing.

Further, as the technology for compressing music files into MPEG 1 audio layer 3 (MP3) has rapidly developed, the portable terminals have expanded to become multimedia devices capable of replaying music files, moving picture files and the like, as well as communication devices.

However, most hands-free devices used with portable terminals are still limited to voice communication, some of which being earphones performing stereo functions for playing music files. Since the hands-free devices provided in the pair of earphones are generally connected to the portable terminals by a cable, voice communication therewith is inconvenient. Furthermore, even though a user of a portable terminal that incorporates multimedia functions may use a hands-free device, the user must operate the portable terminal in order to play music files even when the user is not carrying out voice communication. Thus, the user cannot efficiently use the hands-free device.

SUMMARY OF THE INVENTION

Accordingly, the present invention has been developed in order to solve the above-mentioned problems occurring in the prior art, and an object of the present invention is to provide a wireless stereo headset capable of outputting mono or stereo sounds according to a user's necessity.

Another object of the present invention is to provide a wireless stereo headset capable of carrying out voice communication using one of the headsets when a user communicates with others by using a portable terminal, while providing stereo sounds using the full headset according to the user's necessity.

Still another object of the present invention is to provide a wireless stereo headset in which it is possible to play and stop a sound medium, to control sound volume and to select music even though i a portable terminal having multimedia function is not separately operated.

In order to accomplish these objects, there is provided a wireless stereo headset including a first headset including a speaker unit and a Bluetooth® enabled module, for converting sound signals received from a device, transmitting the sound signals into sounds and outputting the sounds, and a second headset including a speaker unit and a Bluetooth® enabled module, for selectively receiving a portion of the sound signals which is converted into sounds and outputting the sounds, thereby achieving mono sound by using the first headset according to a user's request or achieving stereo sound by using the first and second headsets.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings. In the description of the present invention, a detailed description of known functions and configurations incorporated herein will be omitted for the sake of clarity.

Figure 1:
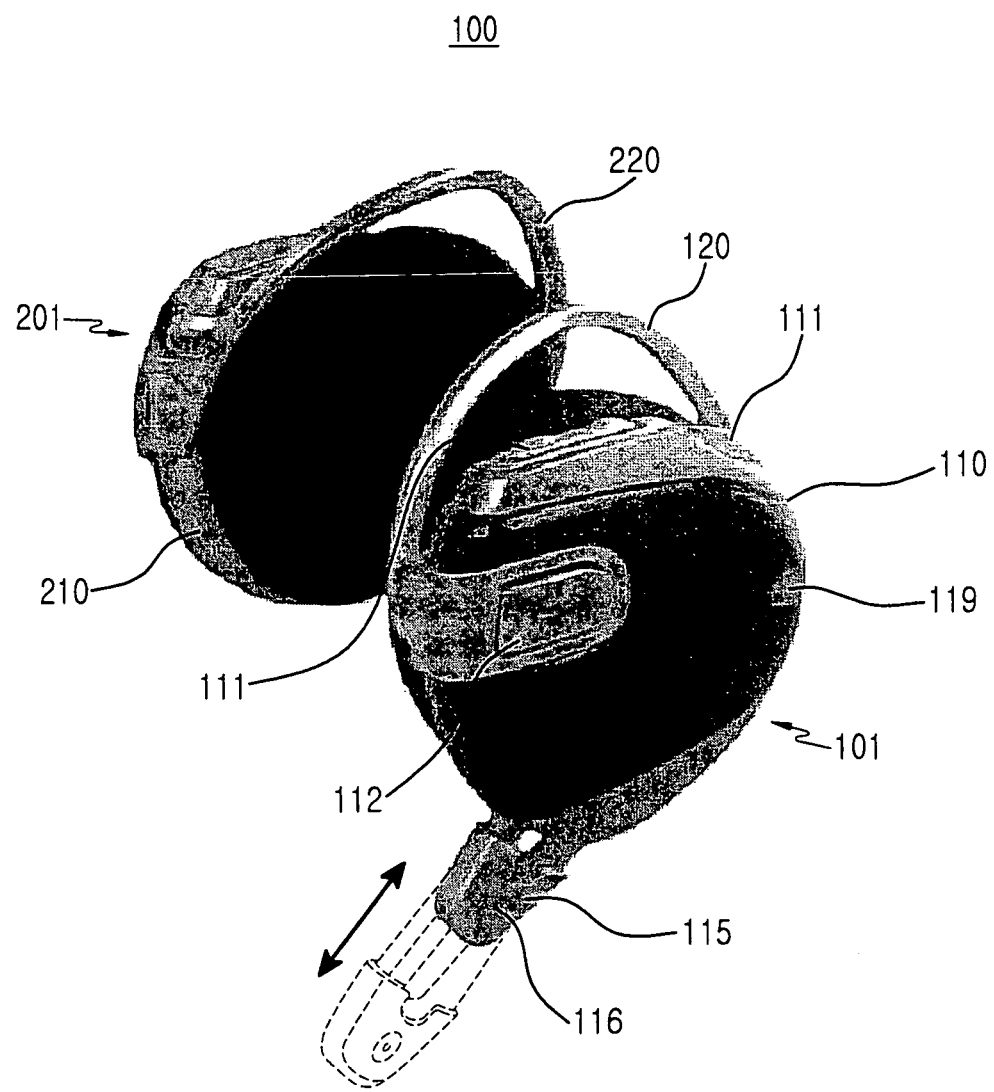
FIG. 1 is a perspective view showing a wireless stereo headset according to a preferred embodiment of the present invention.
Figure 2:
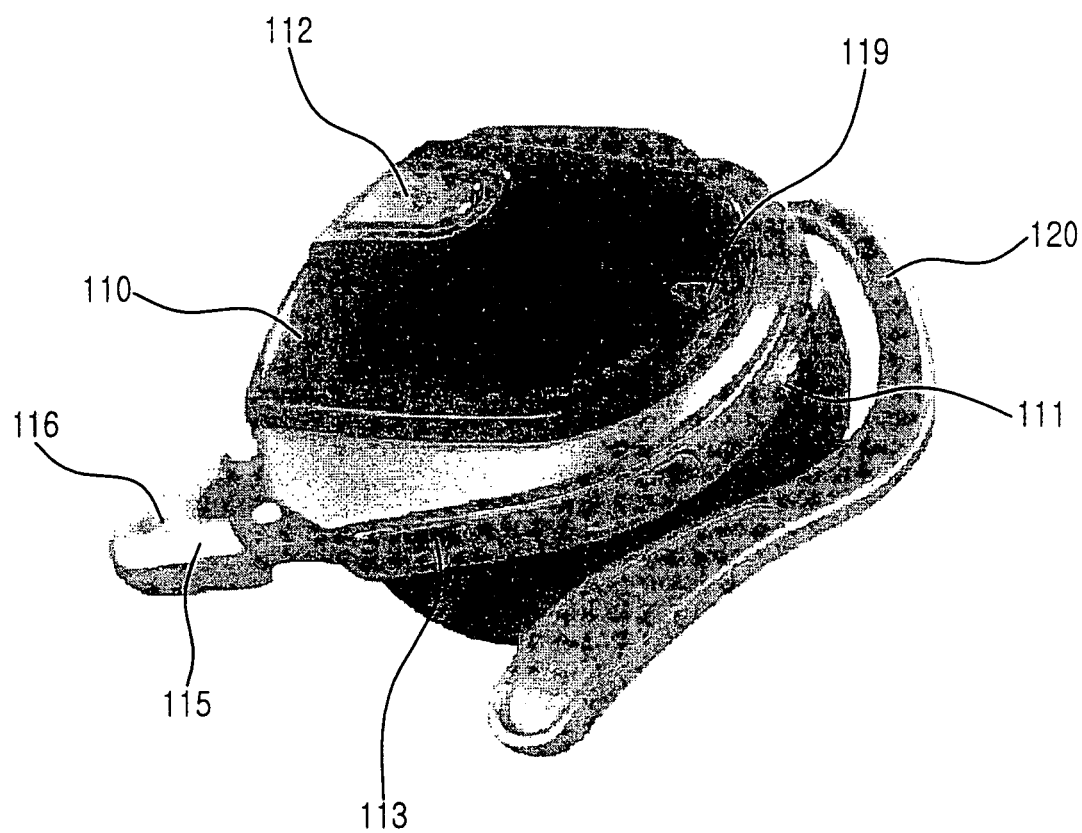
FIG. 2 is a perspective view showing a first headset of the wireless stereo headset according to the preferred embodiment of the present invention shown from a different perspective in FIG. 1.

As shown in FIGS. 1 and 2, a wireless stereo headset 100 according to a preferred embodiment of the present invention includes a pair of mono headsets 101 and 201.

The mono headsets 101 and 201 include housings 110 and 210 and headset frames 120 and 220, respectively.

Figure 3A:
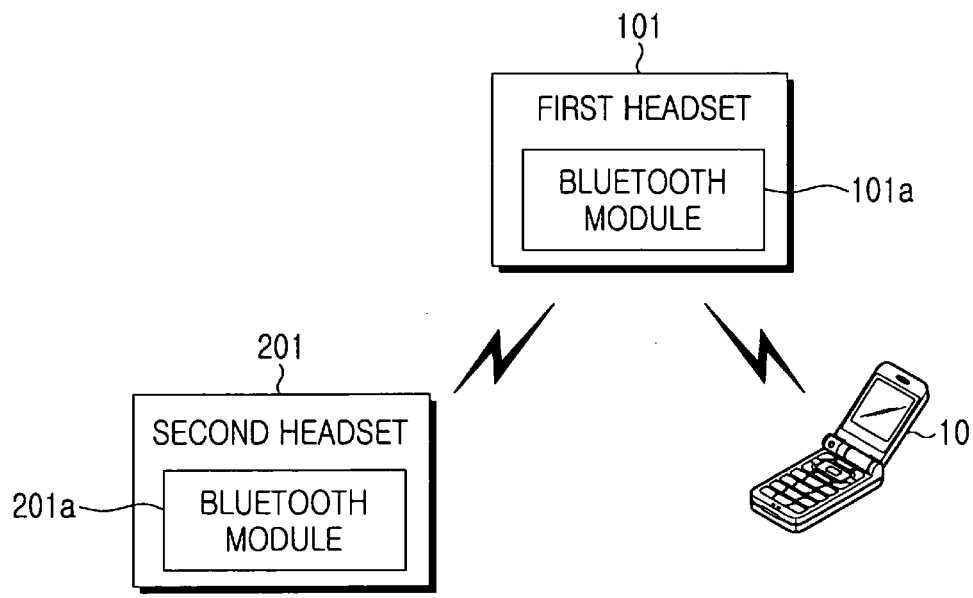
FIGS. 3A and 3B are views illustrating operation of the Wireless stereo headset according to the preferred embodiment of the present invention shown in FIG. 1, and include modules enabled by Bluetooth®, which is a registered trademark of Bluetooth SIG, Inc.
Figure 3B:
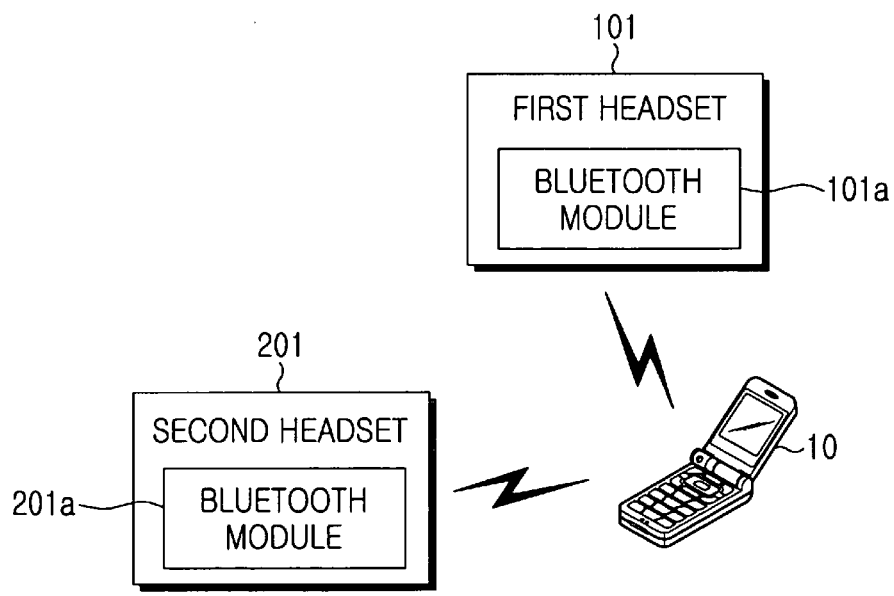

The housings 110 and 210 contain speakers for converting sound signals received from a sound device, transmitting the sound signals into sounds and outputting the sounds, and Bluetooth® enabled modules 101a and 201a for performing local area wireless communication (see FIGS. 3A and 3B). Portions of the housings 110 and 210 from which the sounds are output and which contact the user's ears are covered with fibrous padding to improve comfort.

The headset frames 120 and 220 have one end connected to the housings 110 and 210 and surround at least a portion of a periphery of the housings 110 and 210. The one end of the headset frames 120 and 220 are combined with the housings 110 and 210 respectively, to pivot about a rotating axis A (not shown) to enable a user to wear the headsets 101 and 201 with greater convenience. Meanwhile, if the wearable frames 120 and 220 are manufactured from material having an elasticity in order for a user to comfortably wear the headsets 101 and 201, the one end of the headset frames 120 and 220 may be fixedly combined with the housings 110 and 210, respectively.

A first headset 101 of the headsets 101 and 201 includes function keys 111 for operating a sound device capable of transmitting sound signals, such as a play key, a stop key, a volume control key, a music selection key and the like, and an on/off key 112 for performing a function of communication with a portable terminal. The function keys 111 and the on/off key 112 are installed on the housing 110.

The function keys 111 for performing the play and stop of the sound device are arranged along a peripheral surface of the housing 110. The function keys 111 preferably have different shapes so that a user can recognize the function of each key by touch even though the user can see the keys. Because the first headset 101 has the function keys, a user of a device such as a sound device or a portable terminal, which has a Bluetooth® enabled module connectable with the Bluetooth® enabled modules 101a and 201a of the first headset 101, can play and stop the device, control volume of the device, and select music by using the first headset 101.

The communication on/off key 112 is installed on an exterior side of the housing 110 in order to distinguish the on/off key 112 from the function keys 111.

Only one function key 111 may be installed in the housing 110, to which a number of key values are assigned to allow the first headset to be small and light. When the key values are assigned to the one function key, the function key can be set up so that a variety of signals are generated according to operation numbers of the function key or times of continuously operating the function key. Thus, the number of keys to be installed in the first headset 101 can be reduced, thereby accomplishing the reduced size and weight of the first headset.

Further, a transmitter 115 is installed on the first headset 101 in order to provide a voice communication function. The transmitter 115 extends from a portion of the peripheral surface of the housing 110, which contains a microphone. A microphone hole 116 is formed on a portion of an exterior surface of the transmitter 115 so that the user's voice can reach the microphone contained in the transmitter 115. The microphone of the transmitter 115 converts the user's voice into electric signals and then transfers the user's voice signals to the portable terminal through the Bluetooth® enabled module 101a of the first headset 101. The portable terminal receives the voice signals and then transmits the voice signals to a mobile communication service provider or another user. Thereby, the user can perform the voice communication in a mono mode by using the first headset 101 wirelessly connected to the portable terminal.

Meanwhile, the transmitter 115 can effectively convert the user's voice into electric signals when the user's mouth is closer to the transmitter 115. Therefore, it is possible to permit the transmitter 115 to retractably extend from the housing 110 in order to be closer to the user's mouth. A guide recess is formed in the housing 110 to receive the transmitter 115, such that the user can extract the transmitter 115 from the housing 110 if necessary.

As the function keys 111 and the on/off key 112 are provided on the housing 110 of the first headset 101, the user can perform the voice communication by operating the first headset 101 wirelessly connected with the portable terminal.

The housing 110 is provided with an internal battery in order to supply electricity to operate the speaker and the Bluetooth® enabled module 101a contained therein. In addition, the housing 110 has a jack connector 113 to connect an external electric source to the first headset 101. Thus, after using the first headset 101, the user can charge the internal battery contained in the housing 110 of the first headset 101.

Further, the first headset 101 has a luminous element 119 positioned on the housing 110 thereof. The luminous element 119 flickers on and off to correspond to a reception of signals transmitted to and received from the sound device providing sound signals or the portable terminal. The luminous element 119 flickers at a time interval when the reception of the signals is high, and is off when there are no sound signals to be converted into sounds. Meanwhile, the luminous element 119 may be set up to display the turn-on/off function of the first headset 101.

The function and on/off keys 111 and 112 may be installed only in the first headset 101. However, the luminous element 119 may be installed in the first and second headsets 101 and 201 so as to display the reception of signals or on/off of the electric source.

The second headset 201 also contains components such as a speaker, the Bluetooth® enabled module and a battery, and has a jack connector (not shown) for charging the battery. The second headset cooperates with the first headset 101 to fashion the stereo headset. Although not shown, the second headset 201 will include a switch for turning on/off the electric source.

The second headset 201 containing the Bluetooth® enabled module 201a only communicates with the first headset 101, or communicates with the sound device or portable terminal transmitting sound signals which contains the Bluetooth® enabled module, so as to receive and convert a part of the sound signals transmitted from the sound device or portable terminal into sounds and then output the sounds. At this time, the first and second headsets 101 and 201 are arranged opposite each other and provide the stereo sounds.

FIG. 3 is a view illustrating an operation of the wireless stereo headset 100 according to the preferred embodiment of the present invention shown in FIG. 1. In FIG. 3, a portable terminal 10 is used as a device for transmitting sound signals. The portable terminal performs a mobile communication service such as voice communication and plays a sound medium such as an MP3 file.

The Wireless stereo headset 100 can communicate with the portable terminal 10 via the first headset 101. The second headset 201 can receive the sound signals through two paths according to two different settings.

Using a first setting as shown in FIG. 3A, while maintaining a communication with the portable terminal, the first headset 101 can receive and convert the sound signals transmitted from the portable terminal 10 into sounds and provide the sounds to a user, or can convert the user's sounds into electric signals and transmit the electric signals to the portable terminal 10. Furthermore, the second headset 201 receives a part of the sound signals transmitted from the portable terminal 10 by way of the first headset 101, converts a portion of the sound signals into sounds and delivers the sounds to the user.

In the first setting of FIG. 3A, the user can perform voice communication through the portable terminal 10 by using the first headset 101 even when the portable terminal 10 is not separately operated. The user also can use the second headset 201 to perform voice communication.

A user can listen to music with the portable terminal 10 in the first setting of FIG. 3A, using both the first and second headsets 101 and 201. Further, since the user can play the sound medium, stop the play of the sound medium and select the sound medium by using the function keys 111 provided to the first headset 101, the user can conveniently listen to the music, even while the portable terminal 10 is not separately operated.

Using a second setting as shown in FIG. 3B, the first headset 101 operates in the same fashion as in the first setting of FIG. 3A. However, the second headset 201 can communicate with the portable terminal 10 separate from the first headset 101. Thus, the user can perform voice communication by using the second headset 201 without the first headset 101 if the second headset 201 is also provided with a transmitter.

When playing music with the portable terminal, the first headset 101 converts a portion of sound signals into sounds while the second headset 201 converts the remainder of the sound signals into sounds. Therefore, the user enjoys stereo sounds through the first and second headsets 101 and 201.

Figure 4:
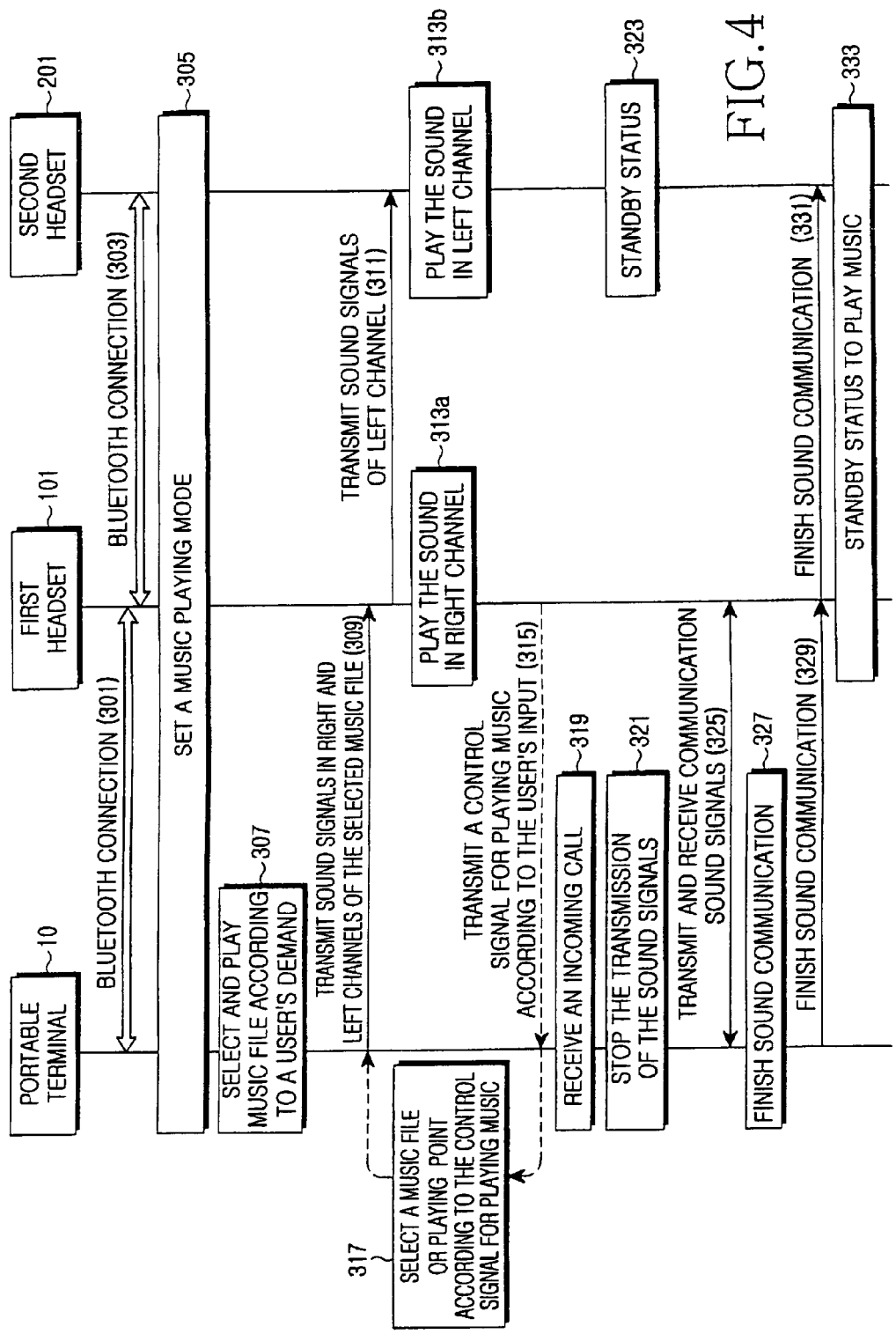
FIG. 4 is a block diagram illustrating an operation between the wireless stereo headset and a portable terminal in a first music playing mode according to the preferred embodiment of the present invention, and includes connections enabled by Bluetooth®, which is a registered trademark of Bluetooth SIG, Inc.
Figure 5:
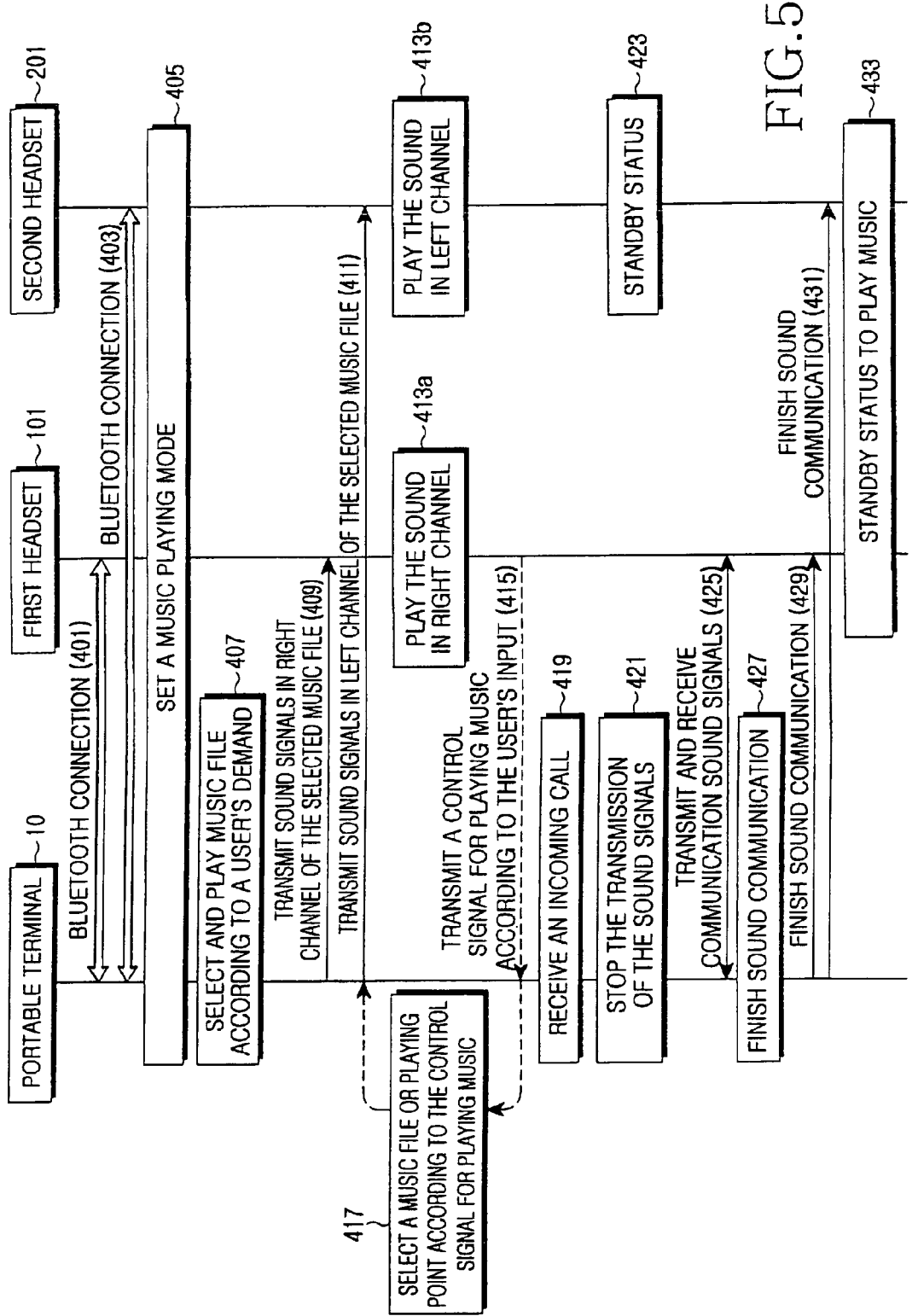
FIG. 5 is a block diagram illustrating an operation between the wireless stereo headset and the portable terminal in a second music playing mode according to the preferred embodiment of the present invention, and includes connections enabled by Bluetooth®, which is a registered trademark of Bluetooth SIG, Inc.

FIGS. 4 and 5 show operations of the headsets 101 and 201 and the portable terminal in the first and second settings as shown in FIGS. 3A and 3B, respectively. Referring to FIG. 4, the portable terminal 10 is connected with the first headset 101 by the Bluetooth® enabled module in step 301. The first headset 101 is connected with the second headset 201 by the Bluetooth® enabled module in step 303. Then, the first and second headsets 101 and 201 set the music playing mode according to user's demand at step 305. The portable terminal 10 selects and plays music according to user's demands in step 307. Pursuant to FIG. 4, the user's demand for playing music may be achieved by means of the function keys 111 arranged in the first headset 101. In step 309, the portable terminal 10 transmits the sound signals to the first headset 101 through right and left channels of the music file selected by the user's demand in step 307. The first headset 101 which received the sound signals through the right and left channels in step 309 transmits the sound signals of the left channel to the second headset 102 in step 311. In step 313a, the first headset 101 plays the sound of the right channel received in step 309. In step 313b, the second headset 102 plays the sound of the left channel received in step 311. Thus, the first and second headsets 101 and 201 output the music with the stereo sounds.

Next, in step 315, the first headset 101 transmits music playing control signals to the portable terminal 10 when the user operates one of the function keys 111. The music playing control signals refer to signals for playing sound medium, stopping the playing the sound medium, controlling volume of the sound medium and selecting the sound medium according to the key operation of the function keys 111. In step 317, the portable terminal 10 selects another music file according to the music playing control signal, or changes a playing point of the same music file and progresses toward step 309. Then, the portable terminal 10 transmits the sound signals of the right and left channels to the first headset 101 to play the music.

While the portable terminal 10 plays and outputs the music file through the first and second headsets 101 and 201 in steps 313a and 313b, the portable terminal 10 progresses toward step 321 when the portable terminal 10 receives an incoming call in step 319, and stops transmitting the sound signals to the first headset 101 and progresses toward step 325. Since the transmission of the sound signals to the second headset 201 is stopped, the second headset 102 changes to a standby status in step 323. Meanwhile, the first headset 101 transmits and receives communication sounds to/from the portable terminal 10.

The portable terminal 10 finishes the communication in step 327 and then performs step 329 to inform the first headset 101 thereof. In step 331, the first headset 101 notifies the second headset 201 of finishing communication. Accordingly, the first headset 101 and second headset 201 are set on standby status for playing music in step 333.

FIG. 5 is a block diagram showing the operation of the portable terminal 10 and the wireless headsets 101 and 201 in the music playing mode in accordance with the second setting in FIG. 3B of the preferred embodiment of the present invention.

Referring to FIG. 5, the portable terminal 10 is connected with the first headset 101 by the Bluetooth® enabled module in step 401, while connected with the second headset 201 by the Bluetooth® enabled module in step 403. Then, in step 405 the portable terminal 10 and the first and second headsets 101 and 201 are set to a music playing mode according to the user's demand. In step 407, the portable terminal 10 selects and plays a music file according to the user's demand. Pursuant to FIG. 5, the user's demand for the music file may be achieved by the function keys 111 arranged in the first headset 101. In step 409, the portable terminal 10 transmits sound signals of the right channel of the music file to the first headset 101 according to the demand for playing music in the step 407. In step 411, the portable terminal 10 transmits sound signals of the left channel of the music file to the second headset 201. In step 413a, the first headset 101 plays the sound signals of the right channel received in the step 409. In step 413b, the second headset 201 plays the sound signals of the left channel received in the step 411. Thus, the first and second headsets 101 and 201 can play the music file with stereo sounds.

The first headset 101 transmits music playing control signals to the portable terminal 10 when the user operates one of the function keys 111 at Step 415. The music playing control signal refers to signals generated by operating the function keys 111 to play a music medium, stop playing the music medium, control a volume of the music medium and select the music. In step 417, the portable terminal 10 selects a music file or changes a playing point of the same music file according to the music playing control signals, and progresses toward step 409 so as to transmit the right and left signals to the first and second headsets 101 and 201.

While the portable terminal 10 plays the music file through the first and second headsets 101 and 201 in steps 413a and 413b, the portable terminal 10 progresses toward step 421 when an incoming call is received by the portable terminal 10 in step 419 and stops the transmission of the sound signals to the first headset 101 and progresses to step 425. The second headset 201 sets on a standby status in step 423. Meanwhile, the first headset 101 transmits and receives communication voices to/from the portable terminal 10 in step 425.

The portable terminal 10 progresses toward step 429 when the communication is finished in step 427, and informs the first headset 101 thereof. The portable terminal 10 informs the second headset 201 of finishing the communication in step 431. Thus, the first and second headsets 101 and 201 are set on the standby status for playing the music, in step 433.

As described above, the wireless stereo headset according to the present invention includes a pair of mono headsets containing a Bluetooth® enabled module. The first headset includes function keys for playing the sound medium, stopping the play of the sound medium, controlling the volume of the sound medium and selecting music, and an on/off key for performing communication function, thereby operating the portable terminal to play the sound medium. Thus, only the headset having the transmitter is used during voice communication, while the pair of mono headsets is used to accomplish produce stereo sound when the sound medium is played by means of the portable terminal or the device for transmitting the sound signals. Thereby, one can use the wireless stereo headset conveniently and enjoy an improved sound quality.

In FIGS. 4 and 5, the voice signal for the communication is transmitted from the portable terminal 10 to only the first headset 101 by the Bluetooth® enabled communication module. However, the voice signals may be transmitted from the portable terminal 10 to the second headset 201, as well as the first headset 101. Hence, since the voice signals transmitted to both headsets are the same signal, the sound output from each headset is in mono sound.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A wireless stereo headset system comprising:
   a first headset including a speaker unit and a Bluetooth® enabled module, for receiving a first portion of a sound signal directly from a device through Bluetooth® enabled communication, converting the first portion of the sound signal to a first sound, and outputting and playing the first portion of the sound signal;
   a second headset including a speaker unit and a Bluetooth® enabled module, for receiving a second portion of the sound signal directly from the device through Bluetooth® enabled communication, converting the second portion of the sound signal to a second sound, and outputting and playing the second portion of the sound signal to a user; and
   the device, for transmitting the first portion of the sound signal through Bluetooth® enabled communication to the first headset, and for transmitting the second portion of the sound signal through Bluetooth® enabled communication to the second headset, thereby achieving stereo sound by using the first and second headsets,
   wherein the first and second portions of the sound signals correspond to right and left channels of a music file, respectively.

2. The wireless stereo headset system as claimed in claim 1, wherein the first and second headsets each include a housing containing the speaker unit and a wearable frame surrounding at least a portion of and spaced apart from a periphery of the housing and having one end connected to the housing.

3. The wireless stereo headset system as claimed in claim 1, wherein the first headset performs functions for transmitting and receiving signals to and from the device through the Bluetooth® enabled module.

4. The wireless stereo headset system as claimed in claim 1, wherein the device includes an audio device for playing sound media and the first headset further includes at least one key for playing the sound media, stopping the playing of the sound media, controlling volume of the sound media and selecting the sound media while performing a communication function with the audio device.

5. The wireless stereo headset system as claimed in claim 1, wherein the first and second headsets each include an interior battery and a jack connector for connection to an electric source for charging the interior battery.

6. The wireless stereo headset system as claimed in claim 1, wherein the device includes a portable terminal providing a voice communication function, and the first headset includes a microphone unit for converting the user's voice into electric signals and can enable voice communication by transmitting the electric signals to the portable terminal through the Bluetooth® enabled module.

7. The wireless stereo headset system as claimed in claim 6, wherein the first headset includes a housing containing the speaker unit and a transmitter extending from an outer peripheral surface of the housing, the microphone unit being disposed in the transmitter.

8. The wireless stereo headset system as claimed in claim 7, wherein the transmitter extends retractably from the housing.

9. The wireless stereo headset system as claimed in claim 6, wherein the first headset further includes an on/off key for starting and ending the voice communication.

10. The wireless stereo headset system as claimed in claim 6, wherein the first headset further includes a luminous element that flickers according to an extent of reception of signals transmitted and received to and from the portable terminal.

11. A wireless stereo headset system comprising:
    a first headset including a Bluetooth® enabled module and a speaker unit, for outputting and playing a first sound signal if only the first sound signal is received, and transmitting a second sound signal through Bluetooth® enabled communication if first and second sound signals are received;
    a second headset including a Bluetooth® enabled module and a speaker unit, for outputting and playing the second sound signal received from the first headset; and
    a portable terminal for transmitting the first and second sound signals corresponding to right and left channels, respectively, of a music file through the Bluetooth® enabled communication to the first headset according to a user's request, while playing the music file, stopping the playing of the music file when an incoming call is received, and transmitting the first sound signal corresponding voice signals through the Bluetooth® enabled communication to the first headset during a voice communication,
    wherein the first and second headsets each include a housing containing the speaker unit and a wearable frame surrounding at least a portion of and spaced apart from a periphery of the housing and having one end connected to the housing.

12. A wireless stereo headset system comprising:
    a first headset including a Bluetooth® enabled module and a speaker unit, for receiving a first sound signal directly from a portable terminal and outputting and playing the first sound signal;

a second headset including a Bluetooth® enabled module and a speaker unit, for receiving a second sound signal directly from the portable terminal and outputting and playing the second sound signal; and a portable terminal for transmitting the first sound signal corresponding to a right channel of a music file through Bluetooth® enabled communication to the first headset according to a user's request, and transmitting the second sound signal corresponding to a left channel of the music file through the Bluetooth® enabled communication to the second headset, while playing the music file.

* * * * *